United States Patent [19]

Nakamura et al.

[11] Patent Number: 5,659,600
[45] Date of Patent: Aug. 19, 1997

[54] FACSIMILE APPARATUS WITH INTERNAL CAPABILITIES TO DIRECTLY CONNECT TO AN EXTERNAL INFORMATION PROCESSOR

[75] Inventors: Mitsuhiro Nakamura; Kohichi Shibata, both of Osaka, Japan

[73] Assignee: Mita Industrial Co., Ltd., Osaka, Japan

[21] Appl. No.: 398,780

[22] Filed: Mar. 6, 1995

[30] Foreign Application Priority Data

Mar. 11, 1994 [JP] Japan ................... 6-041289

[51] Int. Cl.⁶ ................................................. H04M 11/00
[52] U.S. Cl. ..................... 379/100.14; 358/442; 358/468
[58] Field of Search ........................... 379/100, 96–98, 379/93, 90, 110; 358/400, 434–436, 442, 444, 468, 403, 437

[56] References Cited

U.S. PATENT DOCUMENTS

| | | | |
|---|---|---|---|
| 4,907,094 | 3/1990 | Mishima et al. | 358/437 |
| 4,991,200 | 2/1991 | Lin | 379/100 |
| 5,038,226 | 8/1991 | Nagaishi | 379/100 |
| 5,228,128 | 7/1993 | Kim | 358/442 |
| 5,303,067 | 4/1994 | Kang et al. | 358/442 |
| 5,454,106 | 9/1995 | Perkins | 379/100 |

FOREIGN PATENT DOCUMENTS

| | | | |
|---|---|---|---|
| 58-184866 | 10/1983 | Japan | 358/403 |
| 3-52382 | 3/1991 | Japan | 379/100 |

*Primary Examiner*—Wing F. Chan
*Attorney, Agent, or Firm*—Beveridge, DeGrandi, Weilacher & Young, LLP

[57] ABSTRACT

A facsimile apparatus connected to a personal computer and provided with a scanner mode in which an original image is read out and transmitted to the personal computer, the facsimile apparatus does not wait for re-dialing when no transmission command is received from the personal computer. A control unit of the facsimile apparatus calls the personal computer when the scanner mode is set. When a transmission command is received from the personal computer within a predetermined period of time after the start of the contact, an original image is read out and transmitted. When no command is received within the predetermined period of time, the contact is stopped.

3 Claims, 3 Drawing Sheets ical apparatus with internal capabilities to directly connect to an external information processor

BACKGROUND OF THE INVENTION

1. Field of the Invention

The present invention relates to a facsimile apparatus, and more particularly, to a facsimile apparatus used as a facsimile modem by being connected to an external information processor such as a personal computer.

2. Description of the Prior Art

A system has already been developed to use a facsimile apparatus as a facsimile modem by connecting it to a personal computer. Hereinafter, an operation mode in which the facsimile apparatus is used as a facsimile machine will be referred to as a facsimile mode, and an operation mode in which the facsimile apparatus is used as a facsimile modem by a personal computer will be referred to as a facsimile modem mode.

In the facsimile modem mode, processings of the following three modes are executable:

(1) a mode in which a command (AT command) is transmitted from the personal computer to the facsimile apparatus to cause the facsimile apparatus to dial the number of a specified receiver to transmit data from the personal computer via the facsimile apparatus;

(2) a mode in which the personal computer receives data via the facsimile apparatus; and (3) a mode in which data of an original is read out by the facsimile apparatus and transmitted to the personal computer (hereinafter, this mode will be referred to as a scanner mode).

To execute the scanner mode, first, the facsimile modem mode is selected at an operation unit of the facsimile apparatus. Then, an original is set on the facsimile apparatus. Then, the scanner mode is selected at the operation unit of the facsimile apparatus.

When the scanner mode is set, the facsimile apparatus calls up the personal computer. When called up, the personal computer transmits a transmission command to the facsimile apparatus so that the facsimile apparatus transmits the original image to the personal computer. When receiving the transmission command, the facsimile apparatus reads out the original image and transmits it to the personal computer.

In the scanner mode, when no transmission command is transmitted from the personal computer within a predetermined period of time after the facsimile apparatus calls up the personal computer, the facsimile apparatus stops calling and waits for re-dialing.

If the facsimile modem mode is canceled while the facsimile apparatus is waiting for re-dialing, the re-dial waiting state is maintained until the facsimile modem mode is set again. For this reason, when the facsimile modem mode is canceled while the facsimile apparatus is waiting for re-dialing, the following problems may be caused:

In the case of an original transmission in which transmission is performed while an original is being read out, the operation mode is shifted to the facsimile mode with the original being set on the original stand. In the case of a memory transmission in which an original is read out and stored in the memory and the image data is read out from the memory and transmitted, the operation mode is shifted to the facsimile mode with the image data being stored in the memory.

Moreover, when the facsimile modem mode is set again after the operation mode is shifted from the facsimile modem mode to the facsimile mode, re-dialing is abruptly started. Further, after the operation mode is shifted to the facsimile mode, an operation to be performed in the facsimile modem mode is executed.

SUMMARY OF THE INVENTION

An object of the present invention is to provide a facsimile apparatus with which the above-mentioned conventional problems that are caused by the cancellation of the facsimile modem mode in re-dial waiting state are avoided.

According to the present invention, in a facsimile apparatus functioning as a facsimile modem by being connected to an external information processor such as a personal computer, and having a scanner mode in which an original image is read out and transmitted to the external information processor in the facsimile modem mode, the following are provided: calling means for calling up the external information processor when the scanner mode is set; transmitting means for transmitting the original image to the external information processor when a transmission command is received from the external information processor within a predetermined period of time after a start of the calling by the calling means; and call stopping means for stopping the call by the calling means when no transmission command is received from the external information processor within the predetermined period of time after the start of the calling by the calling means.

In a facsimile apparatus of the above arrangement, the external information processor is called up when the scanner mode is set. Transmission is performed when a transmission command is returned within a predetermined period of time and the call is stopped when no transmission command is returned within the predetermined period of time. Since the call is stopped, the facsimile apparatus is not brought into a state to wait for re-dialing to the external information processor. Naturally, the facsimile apparatus is not maintained in the re-dialing waiting state when the facsimile modem mode is canceled.

It is preferable to provide the facsimile apparatus with original discharging means for discharging the original when the calling is stopped. It is also preferable for the facsimile apparatus having a memory transmission function with storage clearing means for clearing the memory when the calling is stopped. In addition, display means may be provided for displaying that the scanner mode is not executed in a normal manner when the calling is stopped.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, an embodiment of the present invention will be described with reference to the drawings.

Figure 1:
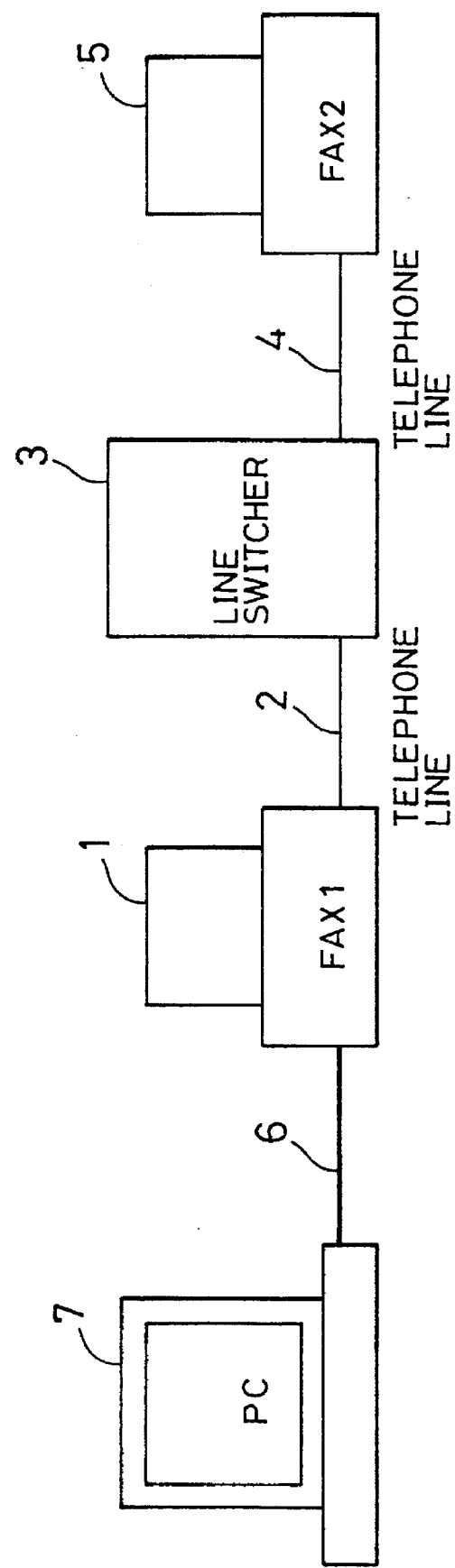
FIG. 1 shows the arrangement of a communications system employing a facsimile apparatus of the present invention.

Referring to FIG. 1, there is shown a facsimile system. A facsimile apparatus 1 (FAX1) is connected to another facsimile apparatus 5 (FAX2) through a telephone line 2, a line switcher 3 and a telephone line 4. The facsimile apparatus 1 is connected to a personal computer 7 (PC) serving as an external information processor through an RS-232C cable 6.

The operation mode of the facsimile apparatus 1 includes the facsimile mode to use the facsimile apparatus 1 as a facsimile machine and the facsimile modem mode to use the facsimile apparatus 1 as a facsimile modem of the personal computer 7.

In the facsimile modem mode, processings of the following three modes are executable:

(1) a mode in which an AT command is transmitted from the personal computer 7 to the facsimile apparatus 1 to transmit data from the personal computer 7 to a specified facsimile apparatus 5 through the facsimile apparatus 1;

(2) a mode in which a data is received by the personal computer 7 via the facsimile apparatus 1; and (3) a scanner mode in which image data of an original is read out by the facsimile apparatus 1 and is transmitted to the personal computer 7.

Figure 2:
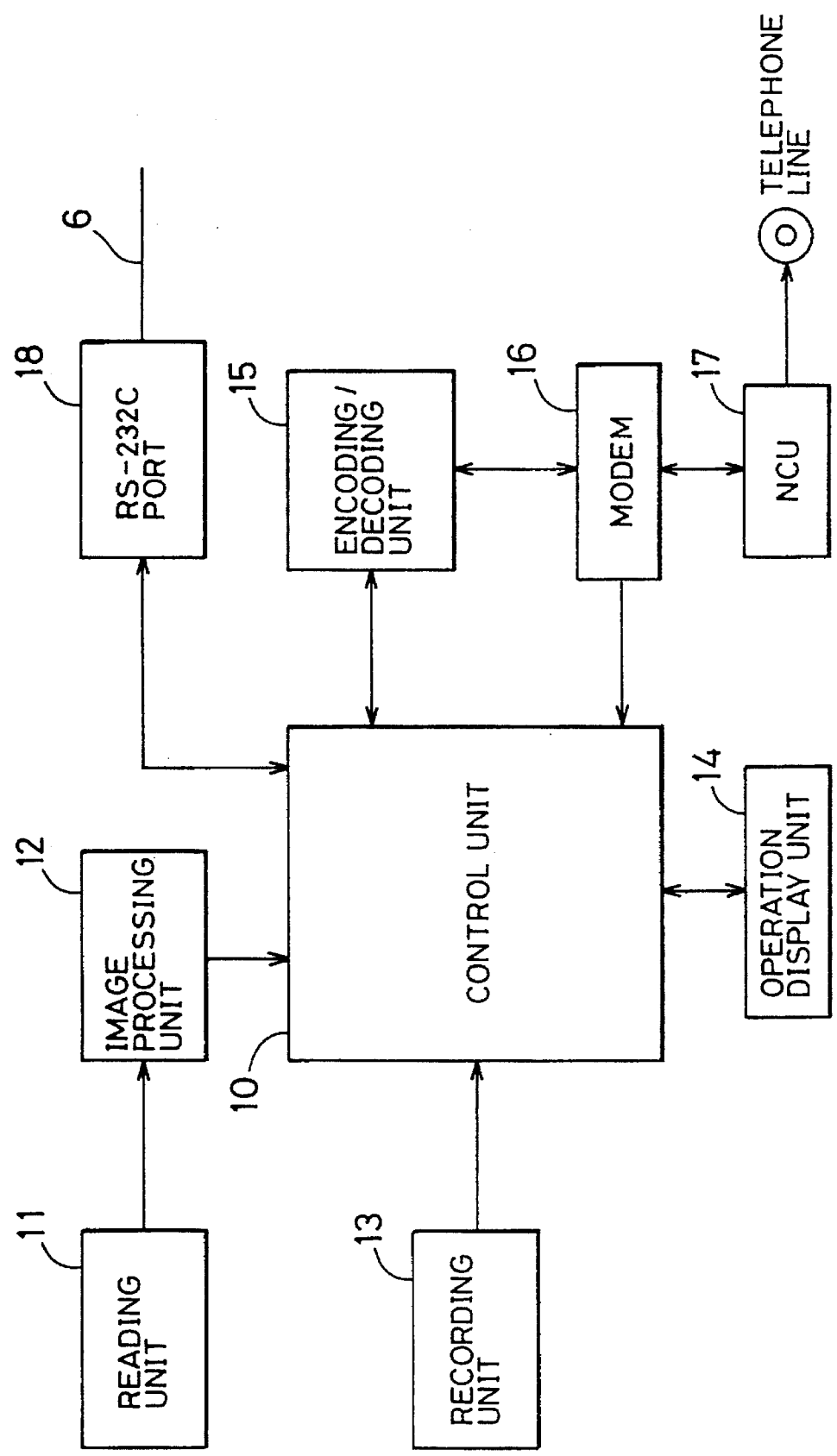
FIG. 2 is a block diagram showing the arrangement of the facsimile apparatus of the present invention.

Referring to FIG. 2, there is shown the arrangement of the facsimile apparatus 1. The facsimile apparatus 1 is controlled by a control unit 10 comprising a microcomputer, and is provided with a reading unit 11, an image processing unit 12, a recording unit 13, an operation display unit 14, an encoding/decoding unit 15, a modem 16, a network control unit (NCU) 17 and an RS-232C port 18.

First, an operation in the facsimile mode will be described.

At the time of transmission, an original image is read out by the reading unit 11, and the image data is binarized by the image processing unit 12. The binarized data is encoded by the encoding/decoding unit 15. The encoded data is modulated by the modem 16 and transmitted via the NCU 17 to the telephone line 2 and then to the facsimile apparatus 5 on the receiving side.

At the time of reception, a reception data transmitted via the NCU 17 to the modem 16 is demodulated by the modem 16. The demodulated encoded data is decoded by the encoding/decoding unit 15. The decoded image data is transmitted to the recording unit 13, so that an image is reproduced on a sheet of recording paper.

Subsequently, an operation will be described which is performed by the operator to transmit an original image from the facsimile apparatus 1 to the personal computer 7.

When the facsimile apparatus 1 is in the facsimile mode, the operator selects the facsimile modem mode at the operation display unit 14 of the facsimile apparatus 1 to change the operation mode. Then, the operator sets an original on the original stand of the facsimile apparatus 1. Then, the operator selects the scanner mode at the operation display unit 14 of the facsimile apparatus 1.

Figure 3:
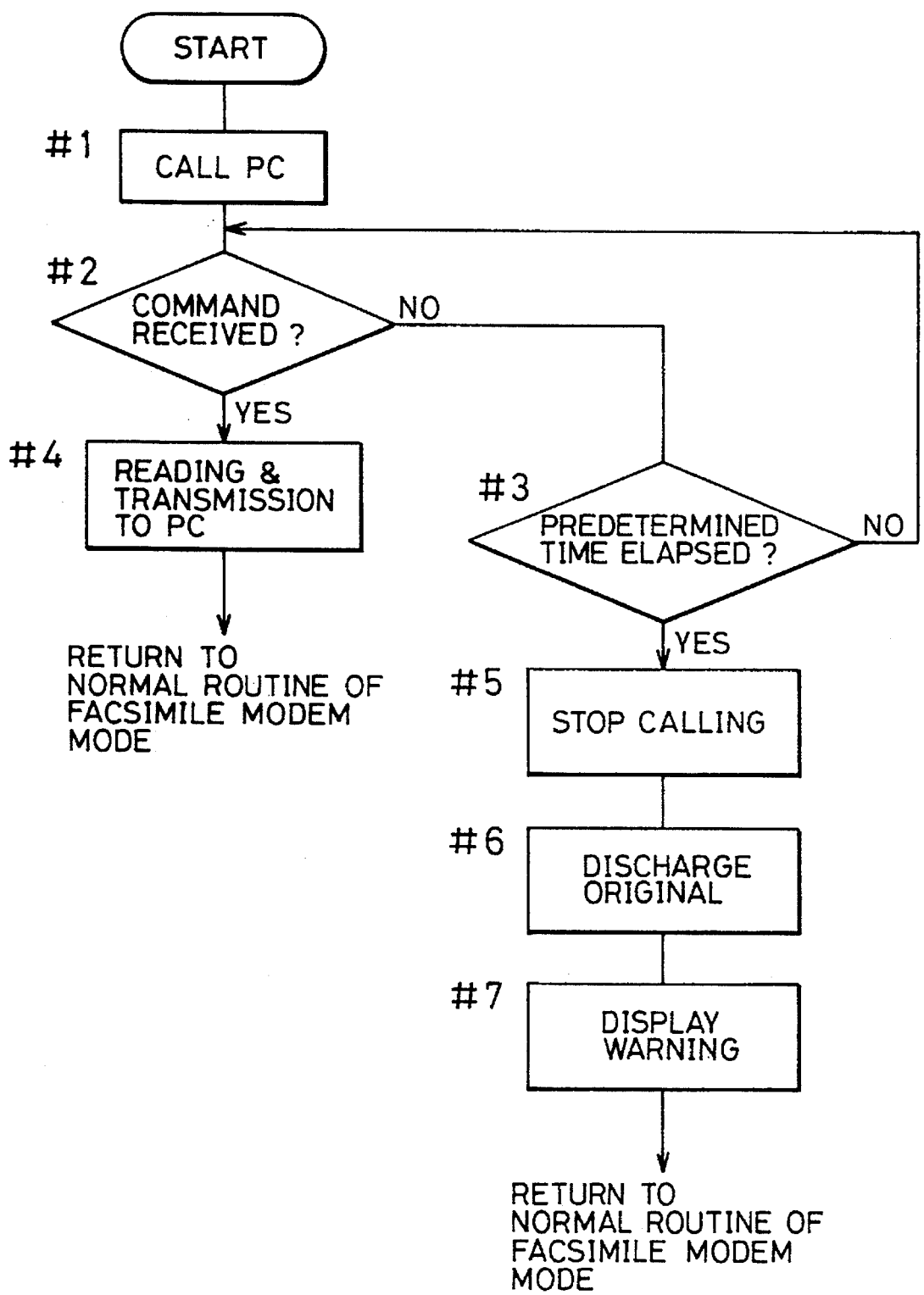
FIG. 3 is the flowchart showing a processing of the facsimile apparatus in a scanner mode.

Referring to FIG. 3, there is shown an operation performed by the facsimile apparatus 1 when the scanner mode is selected in the facsimile modem mode. When the scanner mode is set in the facsimile modem mode, the facsimile apparatus 1 calls (contacts) the personal computer 7 (step #1). When called, the personal computer 7 transmits a transmission command to the facsimile apparatus 1 so that an original image is transmitted from the facsimile apparatus 1 to the personal computer 7.

When the facsimile apparatus 1 receives the transmission command within a predetermined period of time (steps #2 and #3), the original image is read (scanned) in by the reading unit 11 and binarized by the image processing unit 12. The binarized data is encoded by the encoding/decoding unit 15 and the encoded data is modulated by the modem 16.

The modulated data is transmitted via the RS-232C port 18 and the RS-232C cable 6 to the personal computer 7 (step #4). When the entire original image is transmitted, the process returns to the normal routine of the facsimile modem mode.

When no transmission command is transmitted from the personal computer within the predetermined period of time after the facsimile apparatus 1 calls the personal computer 7 at step #1, i.e. when the result of the determination at step #3 is yes, the facsimile apparatus 1 stops the calling (step #5). While the facsimile apparatus interrupts the calling and waits to re-dial in conventional arrangements, in this embodiment, the facsimile apparatus 1 stops and no re-dialing is performed. When the calling is stopped at step #5, the facsimile apparatus 1 forcibly discharges the original set on the original stand (step #6) and causes the operation display unit 14 to display a warning to notify the operator that the processing of the scanner mode did not end in a normal manner (step #7). Thereafter, the process returns to the normal routine of the facsimile modem mode.

The reasons why no transmission command is transmitted from the personal computer 7 within the predetermined period of time after the facsimile apparatus 1 calls the personal computer 7 include the following: that the power for the personal computer 7 is not on; that applications software for facsimile control, so-called PCFAX software, is not operating on the personal computer 7; or the cable 6 is disconnected.

While in the above-described embodiment, the original transmission mode to transmit image data to the personal computer 7 while reading out an original image from an original is described, the present invention may be employed for the memory transmission mode in which an original image data read out from an original and binarized is stored in a non-illustrated memory so that the binarized data stored in the memory is read out and transmitted at the time of transmission.

In the case of the memory transmission, when the operator sets an original on the original stand and selects the scanner mode, the facsimile apparatus reads out an original image and binarizes it, and the binarized data is stored in memory. When the facsimile apparatus receives the transmission command at step #2 of FIG. 3, the facsimile apparatus reads out binarized data from memory. After being encoded and modulated, the data is transmitted to the personal computer 7 (corresponding to step #4 of FIG. 3). When the facsimile apparatus stops transmitting at step #5 of FIG. 3, the facsimile apparatus clears the memory and displays a warning (corresponding to steps #6 and #7 of FIG. 3).

The above-described embodiment offers the following advantages since the facsimile apparatus 1 stops and performs no re-dialing when no transmission command is transmitted from the personal computer 7 within a predetermined period of time after the facsimile apparatus 1 calls the personal computer 7.

When an original image is read by the facsimile apparatus and transmitted to the personal computer in facsimile modem mode, the facsimile apparatus is prevented from unnecessary re-dialing many times when the personal computer cannot receive any data for a reason such as the power is not activated.

Further, the mode change from the facsimile modem mode to the facsimile mode cannot take place in the re-dial waiting state, and conventional problems which are caused by the cancellation of the facsimile modem mode in the re-dial waiting state are avoided.

Obviously, many modifications and variations of the present invention are possible in light of the above teachings. It is therefore to be understood that within the scope of the appended claims, the invention may be practiced other than as specifically described.

What is claimed is:

1. A facsimile apparatus provided with a facsimile modem mode in which said facsimile apparatus functions as a facsimile modem by being connected to an external information processor and a scanner mode in which an original image is read and transmitted to the external information processor in the facsimile modem mode, said facsimile apparatus comprising:

storing means for storing an original image read from an original;

calling means for contacting the external information processor only once when the scanner mode is set;

transmitting means for reading the original image stored in the storing means and transmitting the original image to the external information processor when a transmission command is received from the external information processor within a predetermined period of time after a start of the calling means;

call stopping means for stopping the calling means when no transmission command is received from the external information processor within the predetermined period of time after the start of the calling means; and storage clearing means for clearing the storing means when the calling means is stopped by the call stopping means.

2. A facsimile apparatus according to claim 1, wherein display means is provided for displaying when the scanner mode is not executed in a normal manner when the calling means is stopped by the call stopping means.

3. A facsimile apparatus according to claim 1, wherein a personal computer is used as the external information processor.

* * * * *